United States Patent [19]

Chou

[11] Patent Number: 4,977,909

[45] Date of Patent: Dec. 18, 1990

[54] PUSH-BUTTON TYPE RETRACTABLE BRUSH

[76] Inventor: Fargo Chou, P.O. Box 10160, Taipei, Taiwan

[21] Appl. No.: 429,974

[22] Filed: Nov. 1, 1989

[51] Int. Cl.⁵ .......................................... A45D 24/10
[52] U.S. Cl. ................................... 132/123; 132/116; 132/121; 15/184
[58] Field of Search ............... 132/112, 116, 120, 121, 132/122, 123, 126, 142, 148, 150; 15/184

[56] References Cited

U.S. PATENT DOCUMENTS

| | | | |
|---|---|---|---|
| 2,156,255 | 4/1939 | Schlicker | 132/123 |
| 2,163,524 | 6/1939 | Arpin | 132/123 |
| 2,245,054 | 6/1941 | Schlicker | 132/123 |
| 2,245,055 | 6/1941 | Schlicker | 132/123 |
| 2,245,056 | 6/1941 | Schlicker | 132/123 |
| 4,191,200 | 3/1980 | Rende | 132/123 |
| 4,226,251 | 10/1980 | Wall | 132/212 |
| 4,376,441 | 3/1983 | Duncan | 132/112 |
| 4,412,365 | 11/1983 | Schmitt | 15/184 |
| 4,527,576 | 7/1985 | Chou | 132/123 |
| 4,574,416 | 3/1986 | Stewart et al. | 15/184 |

FOREIGN PATENT DOCUMENTS 518155 2/1940 United Kingdom ................ 132/123

Primary Examiner—John J. Wilson
Assistant Examiner—Frank A. LaViok, Jr.

[57] ABSTRACT

A retractable brush includes a hollow casing combined by a lower cover drilled with a bristles holes therein and an upper cover, a bristle base slidably held in the casing having a plurality of bristles formed on the base extendible outwardly from the lower cover for combining and brushing use, and a bristle extender having a push button slidably held in the upper cover which is depressed to push the brittle base downwardly in order to extend the bristles outwardly until being locked on the upper cover and upon a disengagement of the push button from the upper cover, the bristles will be retracted into the casing as restored by a restoring spring. Upon the extending of the bristles for combing or brushing operation, a water stream may also be applied through the hollow casing, the bristles holes to spray onto the hairs as being combed or brushed.

1 Claim, 2 Drawing Sheets

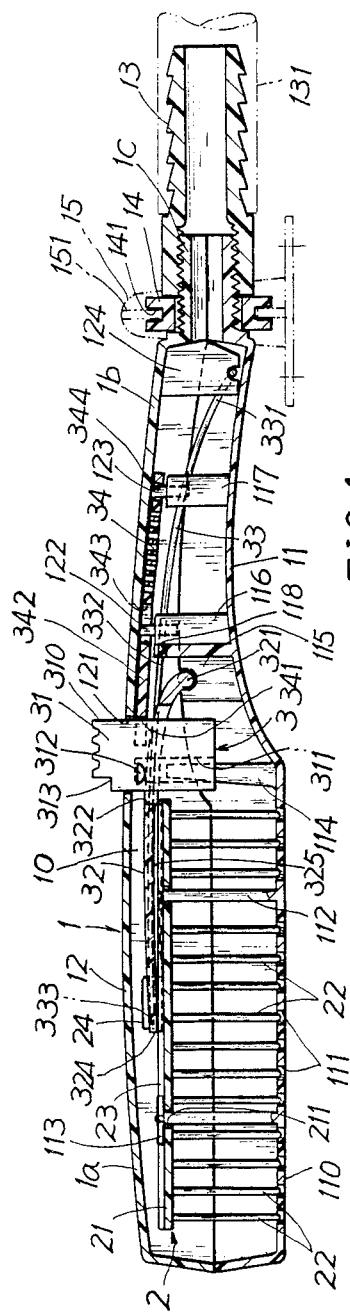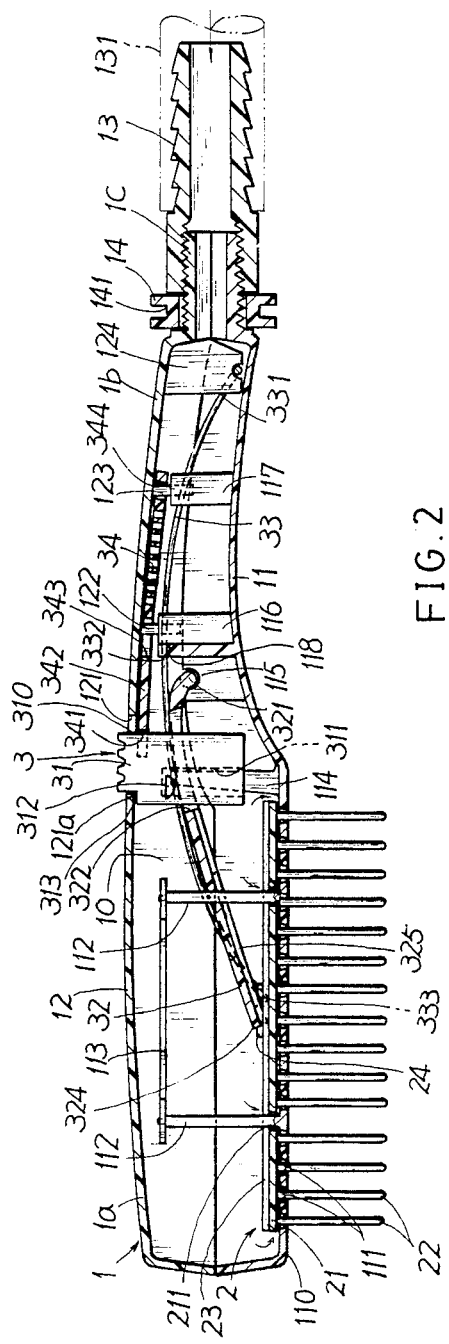

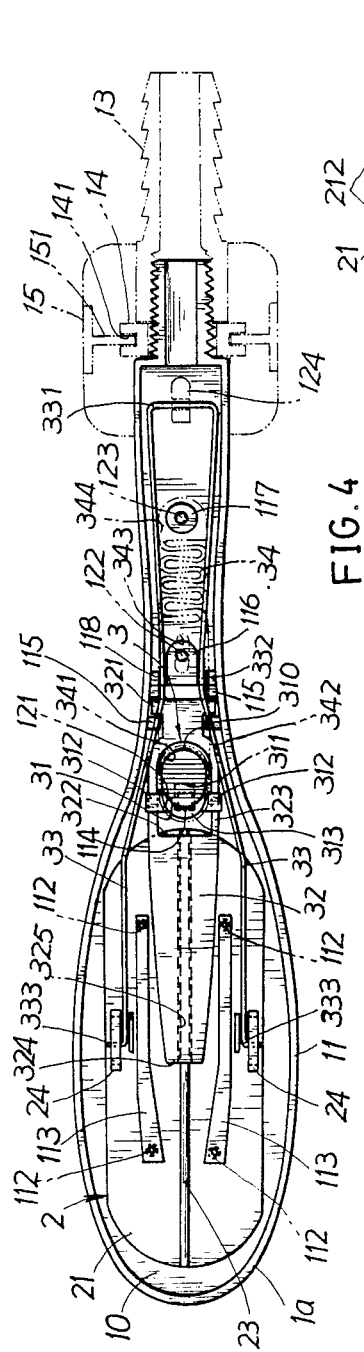
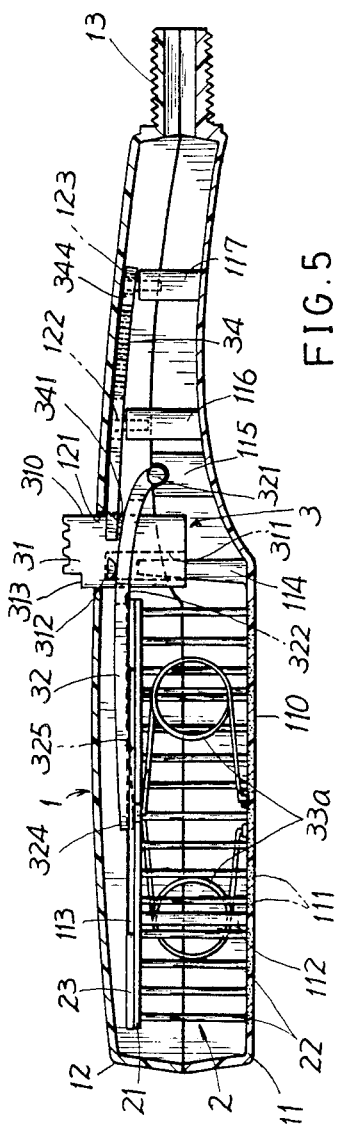
FIG. 3
FIG. 4
FIG. 5

PUSH-BUTTON TYPE RETRACTABLE BRUSH

BACKGROUND OF THE INVENTION

U.S. Pat. No. 4,527,576 granted to the same inventor of this application disclosed a retractable comb and brush, in which a rotating knob 31 should be rotated to push bristle means 2 outwardly to extend bristles for combing use, having the following drawbacks especially when used for combing a pet's hairs:

1. For extending the bristles for combing purpose, a user's hand should hold the comb handle and his another hand then rotates the knob 31 for extending the bristles, causing an inconvenient operation for extending the comb bristles.
2. For combing and washing a pet like a dog, a comb and an additional water hose should be provided so that the water may be sprayed onto the pet body through the water hose and the comb is operated to comb the pet's hair simultaneously, causing an inconvenient combing and washing job.

The present inventor has found the drawbacks of the inventor's prior art and invented the present push-button type retractable brush.

SUMMARY OF THE INVENTION

The object of the present invention is to provide a retractable brush including a bristle extender with a push button resiliently held in a hollow casing which can be applied with water therein, whereby upon a depression of the push button, a bristle means having a plurality of bristles normally retracted in the casing can be extended outwardly from the casing for brushing and combing use and upon the flow of water through a plurality of bristle holes formed in the casing, the water can be sprayed onto the hairs for simultaneous washing and combing uses.

BRIEF DESCRIPTION OF THE DRAWINGS

FIG. 1 is a sectional drawing of the present invention.

FIG. 2 shows a brush having extended bristles in accordance with the present invention.

FIG. 3 shows another perforated bristle base of the present invention.

FIG. 4 is a top view illustration of the present invention when removing an upper cover from that as shown in FIG. 1.

FIG. 5 shows another preferred embodiment of the present invention.

DETAILED DESCRIPTION

As shown in FIGS. 1-4, the present invention comprises: a casing 1, a bristle means 2 and a bristle extender 3.

The casing 1 includes: a lower cover 11, and an upper cover 12 combined with the lower cover 11 to form the casing defining a hollow chamber 10 therebetween, a front brush body 1a, a handle portion 1b pertinent to the brush body 1a, and a rear tube 1c connected to the handle portion 1b. The rear tube 1c is connected with a hose adapter 13 for securing a water hose 131. A collar 14 having an annular groove 141 formed in a perimeter of the collar 14 is rotatably secured on the rear tube 1c of the casing 1 for rotatably hanging the present invention on a bracket 15 fixed on a wall by engaging the annular groove 141 of the collar 14 with an arcuate plate 151 formed on the bracket 15 as shown in FIGS. 1 and 4.

The lower cover 11 includes: a plurality of bristle holes 111 formed in a bottom plate 110 at the front brush body 1a, a plurality of bristle-extending guides 112 having their lower portions fixed on the bottom plate 110 and having their upper ends secured with at least a limiting plate 113 for limiting the bristle means 2 when retrated into the casing 1, a button stem 114 formed on the bottom plate 110 at a middle portion of the casing 1, a lever bracket 115 formed in a front portion of the handle portion 1b, a pair of pushing-spring stems 116, 117 formed in a middle portion of the handle portion 1b and a restoring-spring fulcrum holder 118 formed in the handle portion 1b adjacent to the lever bracket 115.

The upper cover 12 includes a button hole 121 formed in a middle portion of the cover 12 for protruding a push button 31, a pair of pushing-spring pins 122, 123 respectively engaged with the pair of stems 116, 117 of the lower cover 11 for holding a button-retaining spring 34 thereon, and a fixing plate 124 formed on a rear portion of the cover 12 for securing a rear end 331 of a restoring spring 33 as shown in FIG. 1.

The bristle means 2 includes: a bristle base 21 having a plurality of guide holes 211 formed therein for passing the plurality of bristle-extending guides 112, and a plurality of bristles 22 formed on the base 21 for combing use. The bristle base 21 besides its guide holes 211 may be further perforated with a plurality of water holes 212 as shown in FIG. 3 for draining water therethrough when washing the hairs as being brushed and combed. A reinforced guiding extension 23 is formed on the upper surface of the base 21.

The bristle extender 3 includes: a push button 31, a biasing lever 32 pivotally secured to the casing 1 and operatively depressed by the push button 31, a restoring spring 33 secured between the casing 1 and the bristle means 2 for normally restoring the bristle means 2 upwardly for retracting the bristles 22 in the casing 1, and a button-retaining spring 34 for normally urging the push button frontwardly.

The push button 31 includes: a button block 310 slidably held in the button hole 121, a bottom socket 311 for holding the button 31 on a button stem 114 which may be tapered upwardly as shown in FIG. 1, a horizontal bar 312 transversely formed on the block for depressing the lever 32, and a recessed hook portion 313 formed on an upper front end portion of the block 310 engageable with a front edge portion 121a of the button hole 121 for locking the button 31 on the upper cover 12 when depressing the button 31 downwardly. The button 32 is normally protruded upwardly above the cover 12 ready for its depression.

The biasing lever 32 includes a rear pivot 321 pivotally secured to the lever bracket 115, a button slot 322 formed in a shoulder portion 323 for passing the button block 310 therein, and a front depressing plate 324 having a bottom groove 325 slidably engageable with the reinforced guiding extension 23 longitudinally formed on the base 21. The shoulder portion 323 is operatively depressible by the horizontal bar 312 of button 31.

The restoring spring 33 may be made as a generally U-shaped spring rod as shown in FIGS. 4, 1, and 2, which includes: a rear end 331 secured at the lower cover by the fixing plate 124, a fulcrum portion 332 secured on the holder 118, and two front end portions 333 each secured into a socket 24 formed on the base 21.

The spring 33 normally urges itself upwardly to raise the bristle means 2 to retract the bristles 22 into the casing 1.

The button-retaining spring 34 includes: a pushing plate 342 having a bifurcate arm portion 341 circumferentially disposed around the button block 310, a longitudinal slot 343 for free passing the spring pin 122 allowing a reciprocative movement of the plate 342, and a rear end portion 344 secured on the rear pin 123 and stem 117 in the casing 1. The spring 34 can be made as corrugate spring as shown in FIG. 4 or other spring shapes.

The restoring spring 33 may also be modified as shown in FIG. 5, in which two restoring springs 33a are each secured between the lower cover 11 and the bristle base 21 for normally raising the base 21 for retracting the bristles 22 in casing 1. The shapes of the brush body 1a are not limited, which can be an oval shape as shown in FIG. 4 or in a rectangular shape perpendicular to the handle portion 1b (not shown).

In using the present invention for brushing, combing and washing a pet's hairs or someone's hairs, the push button 31 is depressed to allow its horizontal bar 312 to urge the lever 32 downwardly, of which the depressing plate 324 will push the base 21 downwardly so as to extend the bristles 22 outwardly through the bristle holes 111 for combing use. Upon an opening of a water valve (not shown) to direct water into hose 131, rear tube 1c, the hollow chamber 10 of the casing 1 to be discharged through holes 211, 212, 111 for spraying the hairs as being brushed and combed. Upon the depression of push button 31, the recessed hook portion 313 of the button 31 is engaged under the front edge 121a of cover 12 to lock the button 31 which is frontwardly urged by the pushing plate 342 of the button-retaining spring 34 as shown in FIG. 2. The pushing plate 342 may also seal the button hole 121 of cover 12 for preventing water leakage therefrom when passing water into casing 1.

Upon a disengagement of the button 31 from the front edge 121a of upper cover 12, the restoring spring 33 (or 33a) will restore the bristle means 2 upwardly to retract the bristles 22 into the casing 1 as shown in FIGS. 1 and 5 for storing and handling purpose.

The present invention is superior to a conventional comb with the following advantages:

1. The extending of bristles 22 for brushing and combing use or the retraction of bristles 22 into casing 1 is simply operated by depression or releasing of push button 31 which can be done by a single hand for quick and convenient use.
2. The hair combing, brushing and washing operations can be simultaneously done for saving cost and time.

The present invention can be modified to be a retractable comb, without limiting its shapes and functions. For simple combing and brushing purpose, the water hose connector 13 may also be omitted.

I claim:
1. A push-button type retractable brush comprising:
    a casing having a hollow chamber defined between a lower cover drilled with a plurality of bristle holes therein and an upper cover, a front brush body, a handle portion adjacent to said brush body and a rear tube secured to said handle portion and connected with a water hose for directing water into said hollow chamber of said casing;
    a bristle means having a bristle base slidably held in said casing, and a plurality of bristles formed in said base operatively extendible through said bristle holes for brushing and combing use, said bristle base having a plurality of water holes formed therein, said lower cover including a plurality of bristle-extending guides slidably engageable with a plurality of guide holes formed in said bristle base, and at least a limiting plate formed on an upper end of each said guide to limit an upward movement of said bristle base; and
    a bristle extender including a push button normally protruding above said upper cover of said casing, a biasing lever pivotally secured in said casing operatively depressible by said push button for depressing said bristle base downwardly, a restoring spring secured between said casing and said bristle base for normally restoring said bristle means upwardly to retract said bristles in said casing, and a button-retaining spring secured in said casing normally urging said push button frontwardly to be operatively locked under said upper cover when depressing said push button,
    the improvement which comprises:
    said push button including a button block slidably held in a button hole formed in said upper cover, a bottom socket formed in a bottom of said block held in a tapered button stem formed on said lower cover, a horizontal bar transversely formed on said block for operatively depressing said biasing lever, and a recessed hook portion on an upper front portion of said block operatively engaged with a front edge of said button hole for locking said button under said upper cover when depressing said push button;
    said biasing lever including a rear pivot pivotally secured on a lever bracket formed in said casing, a button slot formed in a middle shoulder portion of said lever for free passing said button therethrough, and a front depressing plate formed on a front end portion of said lever having a bottom groove slidably engageable with a reinforced guiding extension formed on said bristle base, said shoulder portion being operatively depressed by a horizontal bar of said push button to allow said front depressing plate to depress said bristle base downwardly for extending said bristles;
    said button-retaining spring including: a pushing plate formed on a front portion of said button-retaining spring having a bifurcate arm portion circumferentially disposed around said button block for normally sealing said button hole of said upper cover, a longitudinal slot formed in a middle portion of said button-retaining spring reciprocatively held in a first spring stem formed in said casing, and a rear end thereof secured to a second spring stem formed in said casing; and
    said restoring spring including a rear end secured in said casing, a fulcrum portion formed on a middle portion of said restoring spring secured on a fulcrum holder formed in said casing, and two bifurcate front ends of said restoring spring secured to said bristle base, said restoring spring normally restoring said bristle base upwardly to retract said bristles in said casing, whereby upon a depression of said push button, said biasing lever will be forced to depress said bristle base so as to extend said bristles outwardly beyond the lower cover for combing and brushing hairs.

* * * * *